United States Patent
Rowe et al.

(10) Patent No.: US 10,316,722 B2
(45) Date of Patent: Jun. 11, 2019

(54) TWO-STAGE CATALYST FOR REMOVAL OF $NO_x$ FROM EXHAUST GAS STREAM

(71) Applicant: Toyota Motor Engineering & Manufacturing North America, Inc., Erlanger, KY (US)

(72) Inventors: Michael Paul Rowe, Pinckney, MI (US); Torin C. Peck, Ypsilanti, MI (US); Michael Jones, Orchard Lake, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/476,374

(22) Filed: Mar. 31, 2017

(65) Prior Publication Data

US 2018/0283251 A1    Oct. 4, 2018

(51) Int. Cl.
| | |
|---|---|
| *F01N 3/28* | (2006.01) |
| *B01D 53/94* | (2006.01) |
| *B01J 23/755* | (2006.01) |
| *B01J 23/83* | (2006.01) |
| *B01J 35/00* | (2006.01) |
| *B01J 35/02* | (2006.01) |

(52) U.S. Cl.
CPC ....... *F01N 3/2803* (2013.01); *B01D 53/9413* (2013.01); *B01J 23/755* (2013.01); *B01J 23/83* (2013.01); *B01J 35/0013* (2013.01); *B01J 35/023* (2013.01); *B01D 2255/2042* (2013.01); *B01D 2255/2063* (2013.01); *B01D 2255/2092* (2013.01); *B01D 2255/20738* (2013.01); *B01D 2255/20746* (2013.01); *B01D 2255/20753* (2013.01); *B01D 2255/405* (2013.01); *B01D 2255/904* (2013.01); *B01D 2255/9032* (2013.01); *B01D 2255/9202* (2013.01); *F01N 2510/06* (2013.01); *F01N 2510/0684* (2013.01)

(58) Field of Classification Search
None
See application file for complete search history.

(56) References Cited

U.S. PATENT DOCUMENTS

| | | | |
|---|---|---|---|
| 7,146,802 B2 | 12/2006 | Lee | |
| 9,511,358 B2 * | 12/2016 | Nazarpoor | ............. B01J 23/005 |
| 2007/0044444 A1 * | 3/2007 | Oshimi | ............. B01D 46/2429 55/523 |
| 2007/0116870 A1 * | 5/2007 | Dettling | .................. B01J 23/63 427/230 |
| 2013/0312407 A1 * | 11/2013 | Surnilla | .................... F01N 3/22 60/605.1 |

OTHER PUBLICATIONS

Zhu, J. et al., "Effect of Ce on NO direct decomposition in the absence/presence of O2 over La1—xCexSrNiO4 (0 ≤ x ≤ 0.3)", Journal of Molecular Catalysis A: Chemical 234 (2005) p. 9.
Zhu, Y. et al., "Direct NO decomposition over La2 xBaxNiO4 catalysts containing BaCO3 phase", Applied Catalysis B: Environmental 82 (2008) pp. 255-263.
Zhang, H.J. et al., "Catalytic decomposition of N2O over NixCo1—xAlO4 spinel oxides prepared by sol-gel method", Journal of Fuel Chemistry and Technology 43 (2015) pp. 81-87.
Pan, K.L. et al., "Direct N2O decomposition over La2Ni04-based perovskite-type oxides", Journal of the Air & Waste Management Association 64 (2014) pp. 1260-1269.
Zhu, J. et a., "Study of La2—xSrxCuO4 (x=0.0, 0.5, 1.0) catalysts for NO + CO reaction form the measurements of O2-TPD, H2 TPD and cyclic voltammetry", Journal of Molecular Catalysis A: Chemical 238 (2005) p. 35.

* cited by examiner

*Primary Examiner* — Sheng H Davis
(74) *Attorney, Agent, or Firm* — Christopher G. Darrow; Darrow Mustafa PC

(57) ABSTRACT

A co-catalyst system for the removal of $NO_x$ from an exhaust gas stream has a layered oxide and a spinel of formula $Ni_{0.15}Co_{0.85}CoAlO_4$. The system converts to nitric oxide to nitrogen gas with high product specificity. The layered oxide is configured to convert $NO_x$ in the exhaust gas stream to an $N_2O$ intermediate, and the spinel is configured to convert the $N_2O$ intermediate to $N_2$.

10 Claims, 9 Drawing Sheets

TWO-STAGE CATALYST FOR REMOVAL OF NO$_x$ FROM EXHAUST GAS STREAM

TECHNICAL FIELD

The present disclosure generally relates to catalysts for treatment of an exhaust gas stream and, more particularly, to two-stage catalysts for removal of nitrogen oxides from an exhaust gas stream generated by an internal combustion engine.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Catalysts effective at removing NO$_x$ from exhaust emissions are desirable, in order to protect the environment and to comport with regulations directed to that purpose. It is preferable that such catalysts convert NO$_x$ to inert nitrogen gas, instead of converting NO$_x$ to other nitrogen-containing compounds. Catalysts that are effective at low temperature may have additional utility.

Accordingly, it would be desirable to provide a catalyst for the removal of NO$_x$ from exhaust gas, that is effective at low temperature and that has high N$_2$ product specificity.

SUMMARY

This section provides a general summary of the disclosure, and is not a comprehensive disclosure of its full scope or all of its features.

In various aspects, the present teachings provide a catalytic converter for the removal of NO$_x$ from an exhaust gas stream. The catalytic converter includes an inlet configured to receive the exhaust gas stream into an enclosure; and an outlet configured to allow the exhaust gas stream to exit the enclosure. The catalytic converter further includes a co-catalyst system contained inside the enclosure. The co-catalyst system includes a layered oxide configured for catalyzing a reduction reaction of at least one of NO and NO$_2$ to generate N$_2$O. The co-catalyst system also includes a spinel having a formula, Ni$_x$Co$_{1-x}$CoAlO$_4$, configured for catalyzing a decomposition reaction of N$_2$O to N$_2$.

In other aspects, the present teachings provide a two-stage method for the removal of NO$_x$ from an exhaust gas stream. The method includes a step of flowing the exhaust gas stream through a co-catalyst system. The flowing step includes exposing the exhaust gas stream to a layered oxide and catalyzing a reduction of at least one of NO and NO$_2$ to generate N$_2$O. The flowing step also includes exposing the exhaust gas stream to a spinel having a formula Ni$_{0.15}$Co$_{0.85}$CoAlO$_4$ to decompose the N$_2$O to N$_2$.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings provide two-stage catalysts for the removal of nitrogen oxides (NO$_x$) from an exhaust gas stream. The presently disclosed two-stage catalysts employ a two-step chemical transformation to decompose NO$_x$ to nitrogen and oxygen gas, even at relatively low temperature.

The presently disclosed two-stage catalysts include a layered oxide, for the decomposition of NO$_x$ to N$_2$O, and a spinel component, for the decomposition of the N$_2$O intermediate to N$_2$ and O$_2$. Data described herein show that layered oxides are most effective at decomposing NO into N$_2$O, not N$_2$. N$_2$O is known for being a major greenhouse gas and powerful pollutant. This characteristic of N$_2$O formation makes layered oxides a problematic and non-obvious NO catalytic material, especially at lower temperatures ≤550° C. where layered oxides are not particularly active at N$_2$ production to offset this N$_2$O formation. Therefore, the design of a co-catalyst that purposely uses the layered oxide N$_2$O formation to provide a functional advantage is needed. The coupling of the layered oxide with a spinel of overlapping temperature range activity for N$_2$O decomposition, as described below, allows for the N$_2$O generated to be further decomposed to N$_2$. Overall, the decomposition of NO to N$_2$ is approximately doubled using the co-catalyst design compared to either of the constituent catalysts individually.

Figure 1A:
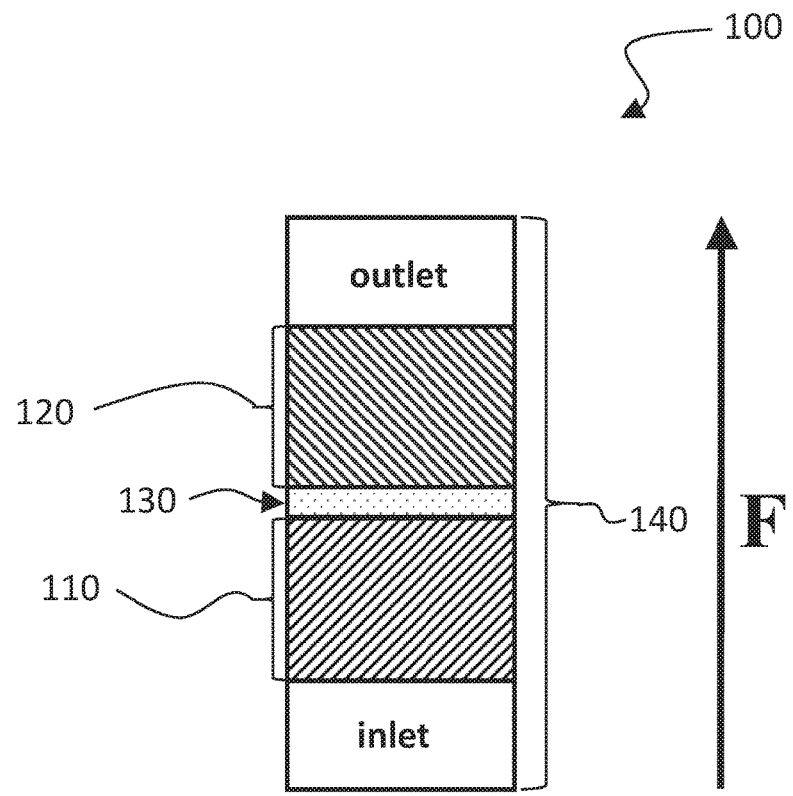
FIG. 1A is a side schematic view of a variation of a co-catalyst system of the present disclosure.
Figure 1B:
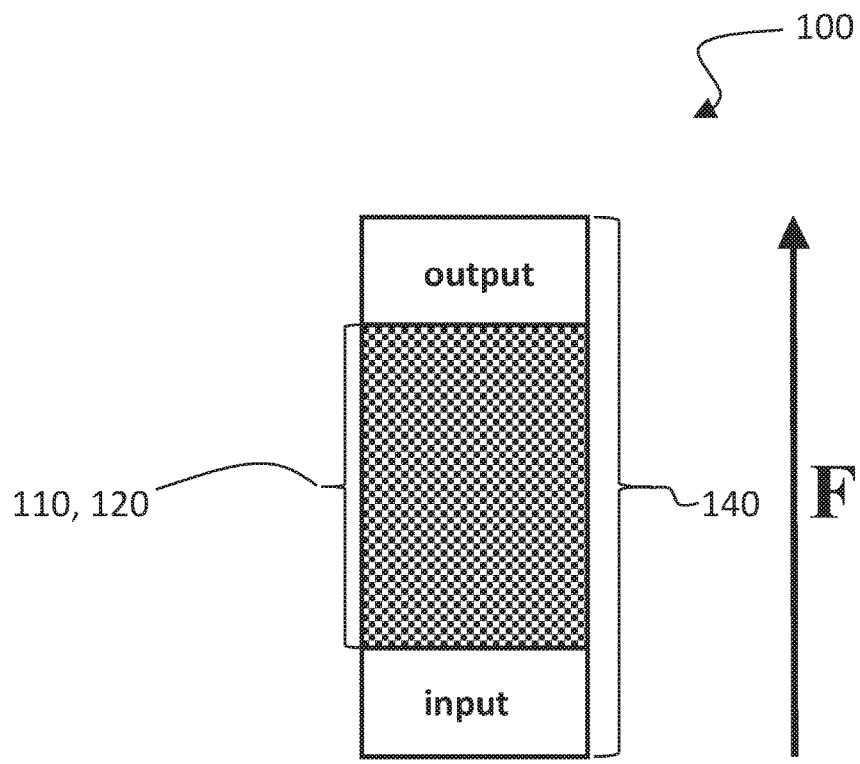
FIG. 1B is a side schematic view of another variation of the co-catalyst system.

Thus, and with reference to FIGS. 1A and 1B, a co-catalyst system 100 for the decomposition of $NO_x$ is disclosed. The co-catalyst system 100 includes a layered oxide 110. In some implementations, the layered oxide can include layered oxide nanoparticles. In certain implementations, the layered oxide 110 can be a layered oxide. In some such certain implementations, the layered oxide 110 can be at least one of $LaBaCoO_4$ and $LaBaFeO_4$. As will be described further below, the layered oxide will be configured to decompose $NO_x$ substantially to $N_2O$. Without implying limitation, such decomposition catalyzed by the layered oxide 110 can proceed, for example, through reactions such as shown below in Reactions I and II:

$$4NO_2 \rightarrow 2N_2O + 3O_2 \quad (I)$$

$$4NO \rightarrow 2N_2O + O_2 \quad (II)$$

The co-catalyst further includes a spinel 120. In certain variations, the spinel 120 can have a formula, $Ni_xCo_{1-x}CoAlO_4$. In certain specific implementations, the spinel 120 can be $Ni_{0.15}Co_{0.85}CoAlO_4$. As will be described further below, the spinel 120 will be configured to decompose $N_2O$ to $N_2$ and $O_2$. Without implying limitation, such decomposition catalyzed by the spinel 120 can proceed, for example, through reactions such as shown below in Reaction III:

$$2N_2O \rightarrow 2N_2 + O_2 \quad (III)$$

It will thus be appreciated that, in operation of the co-catalyst system 100, the layered oxide 110 operates, in part, to partially decompose $NO_x$ and produce an intermediate species, $N_2O$. The spinel 120 then operates to further decompose the intermediate species, $N_2O$, to the desired products, $N_2$ and $O_2$.

In some implementations, the layered oxide 110 and the spinel 120 can be spatially separated from one another, as illustrated in the example of FIG. 1A. In such implementations, the layered oxide and spinel 110, 120 can be in adjacent contact, or, as shown in FIG. 1A, can be separated by a separation space 130. When present, such a separation space can be substantially vacant, or can be occupied with a porous, gas permeable, or other suitable material.

A co-catalyst system 100 of the present disclosure can be deployed in an enclosure 140 having an inlet and an outlet. The enclosure 140 can be configured to receive an exhaust gas stream through the inlet and to exit the exhaust gas stream through the outlet, such that the exhaust gas stream has a flow direction (represented by the arrow F in FIGS. 1A and 1B). In implementations in which the layered oxide 110 and spinel 120 are spatially separated (FIG. 1A), the layered oxide 110 can be positioned in an upstream portion of the exhaust gas stream and the spinel 120 can be positioned in a downstream portion of the exhaust gas stream. As used herein, the expression "upstream portion" can refer to a region proximal to a gas inlet portion; and the expression "downstream portion" can refer to a region proximal to a gas outlet portion.

It will be understood that in implementations in which the layered oxide 110 is positioned in an upstream portion of the exhaust gas stream and the spinel 120 is positioned in a downstream portion of the exhaust gas stream, this can cause the exhaust gas stream to encounter the layered oxide 110 before the exhaust gas stream encounters the spinel 120. Thus, in such implementations, as the exhaust gas stream flows through the co-catalyst system 100, it first encounters the layered oxide 110 so that $NO_x$ within the exhaust gas stream is substantially or entirely decomposed to $N_2O$ in consequence.

In other implementations, the layered oxide and spinel 110, 120 can be intermixed, substantially occupying the same space, as shown in FIG. 1B. In such implementations, the layered oxide and spinel 110, 120 occupy overlapping regions such that $NO_x$ are converted to $N_2O$, and $N_2O$ is converted to $N_2$ and $O_2$, within overlapping regions. It will be understood that various intermediate positions can also be employed, such as partial overlap, stepped or gradual concentration gradients, etc. In general, it is desirable that all portions of the layered oxide 110 be positioned upstream of at least some portion of the spinel 120. A co-catalyst system 100 of the present disclosure in which the layered oxide 110 is upstream and the spinel 120 is downstream, as shown in FIG. 1A, can be referred to alternatively as a "sequential co-catalyst." A co-catalyst system 100 in which the layered oxide 110 and the spinel 120 are substantially intermixed, as shown in FIG. 1B, can be referred to alternatively as a "mixed co-catalyst".

Figure 2A:
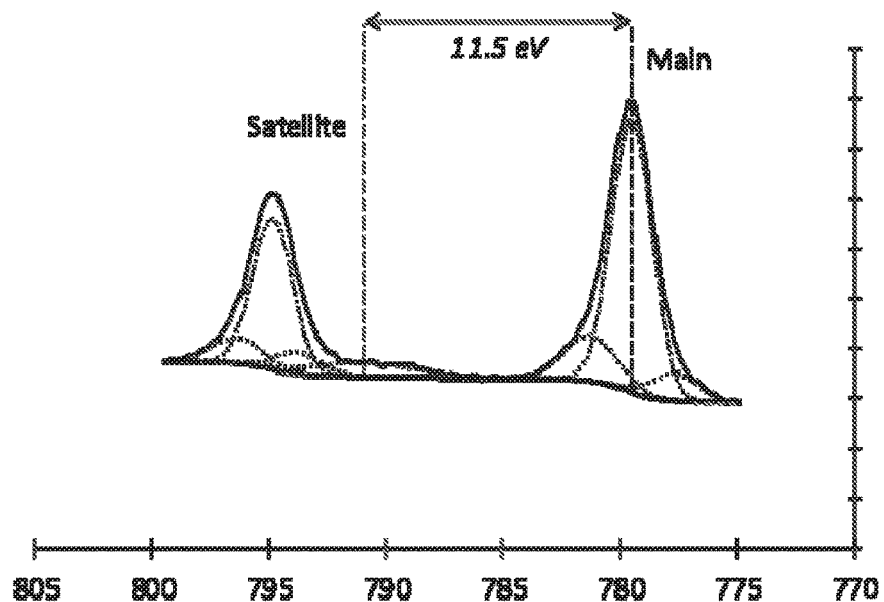
FIG. 2A is a Co2p$_{3/2}$ x-ray photoelectron spectroscopy (XPS) spectrum of a LaBaCoO$_4$ layered oxide.
Figure 2B:
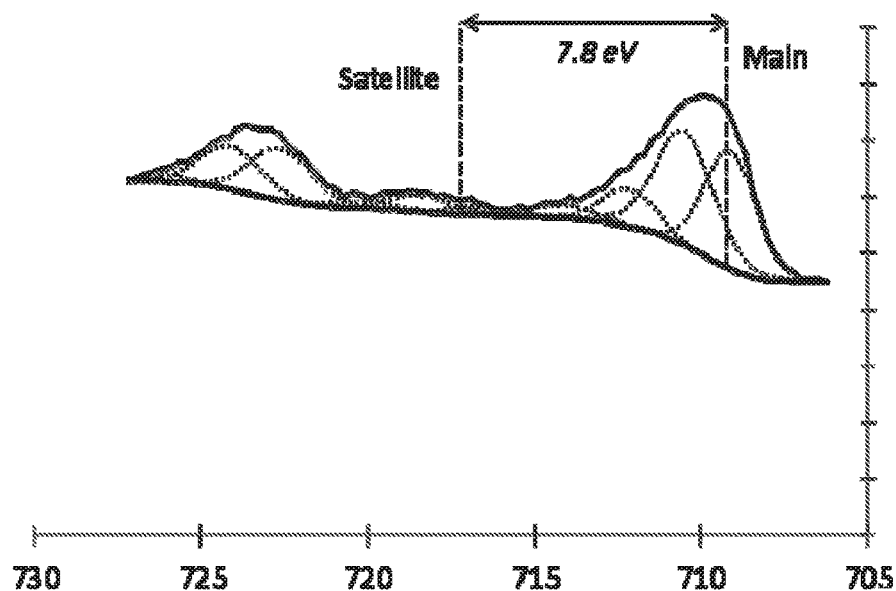
FIG. 2B is a Fe2p$_{3/2}$ XPS of a FeBaCoO$_4$ layered oxide.

FIGS. 2A and 2B show x-ray photoelectron spectroscopy (XPS) data for two exemplary layered oxides, $LaBaCoO_4$ and $LaBaFeO_4$, respectively. The surfaces of the $LaBaCoO_4$ and $LaBaFeO_4$ exemplary layered oxides 110 contain $Co^{3+}$ and $Fe^{3+}$ cations, respectively, based on the XPS binding energy differences between the main and satellite peaks shown in FIGS. 2A and 2B. Binding energy differences of 11.5 and 7.8 eV at the $2p_{3/2}$ binding energies are representative of $Co^{3+}$ and $Fe^{3+}$, respectively. This is in contrast to the anticipated observation, where binding energy differences between the main and satellite peaks would be ~4.8 and ~5.9 eV. These smaller binding energy differences correspond to $Co^{2+}$ and $Fe^{2+}$ respectively, and are in line with the assumed 2+ cation B-site occupation for layered oxides of the general formula is $A_2BO_4$. But because defect sites for layered oxides form the $3^+$ version of the B-site and that the exemplary samples are in the form of nanoparticles with an expected occurrence of surface defects, the B-site $2p_{3/2}$ XPS spectra showing the presence of 3+ cations is therefore logically explainable.

Figure 3A:
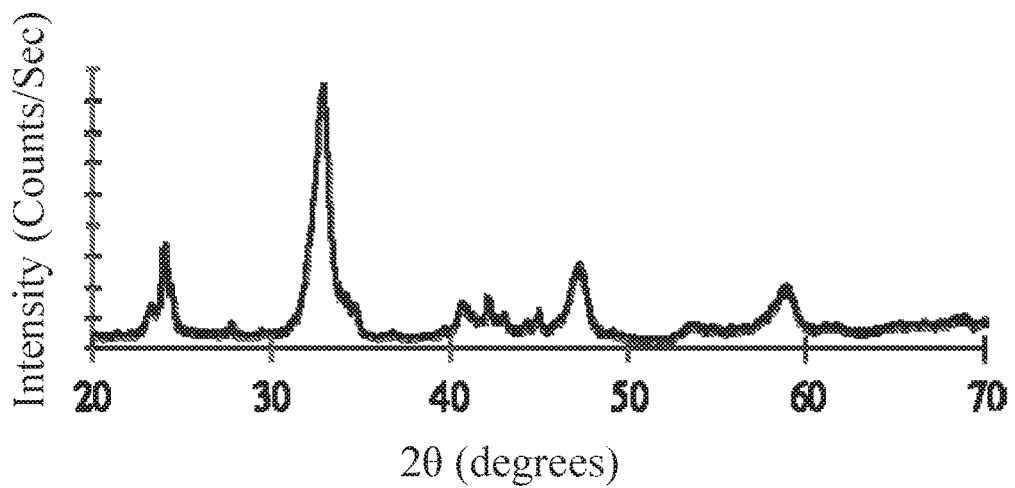
FIG. 3A is an x-ray diffraction (XRD) pattern of the layered oxide of FIG. 2A.
Figure 3B:
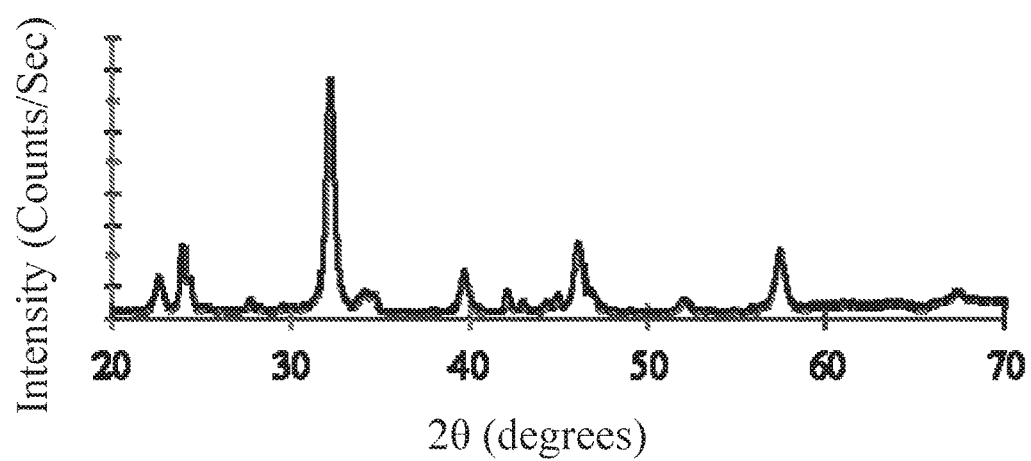
FIG. 3B is an XRD pattern of the layered oxide of FIG. 2B.
Figure 3C:
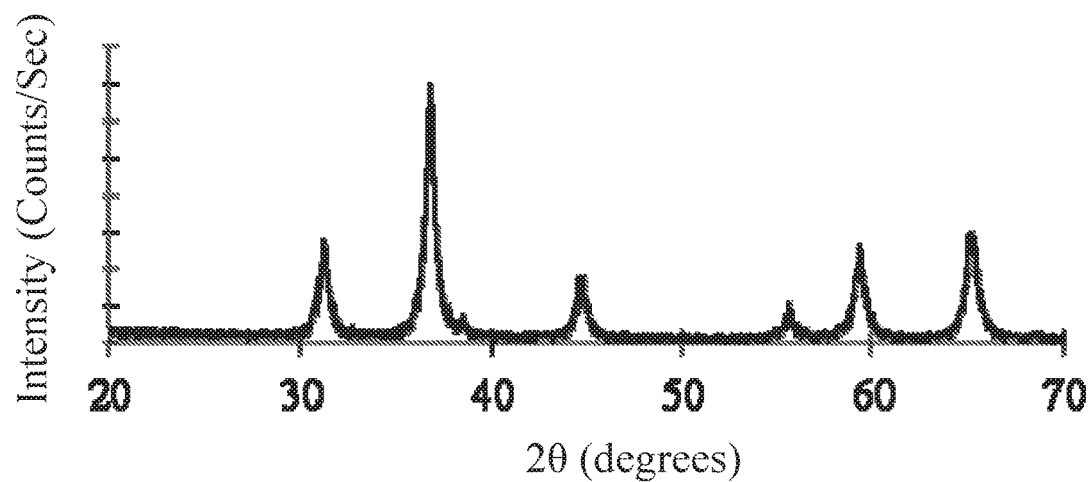
FIG. 3C is an XRD pattern of Ni$_{0.15}$Co$_{0.85}$CoAlO$_4$ spinel.

Powder x-ray diffraction (XRD) patterns for $LaBaCoO_4$, $LaBaFeO_4$, and $Ni_{0.15}Co_{0.85}CoAlO_4$ are shown in FIGS. 3A-3C, respectively. Scherrer analysis of the XRD peak broadening for $LaBaCoO_4$, $LaBaFeO_4$ and $Ni_{0.15}Co_{0.85}CoAlO_4$ determined crystallite sizes to be 14, 7, and 11 nm, respectively, in these examples.

Figure 4A:
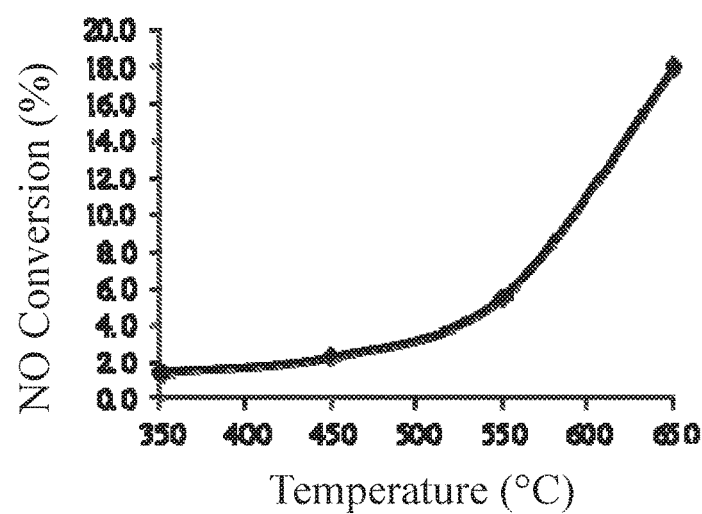
FIG. 4A is a plot of NO conversion percentage as a function of temperature for LaBaCoO$_4$.
Figure 4B:
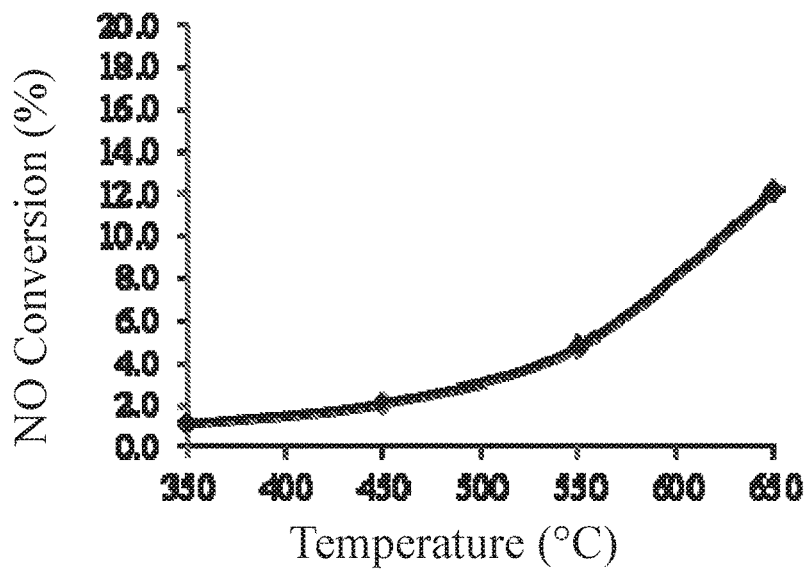
FIG. 4B is a plot of NO conversion percentage as a function of temperature for LaBaFeO$_4$.
Figure 4C:
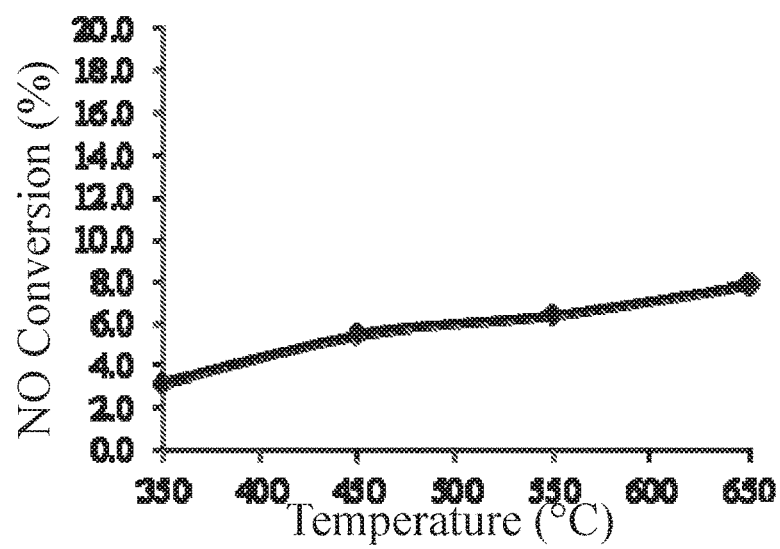
FIG. 4C is a plot of NO conversion percentage as a function of temperature for Ni$_{0.15}$Co$_{0.85}$CoAlO$_4$.
Figure 4D:
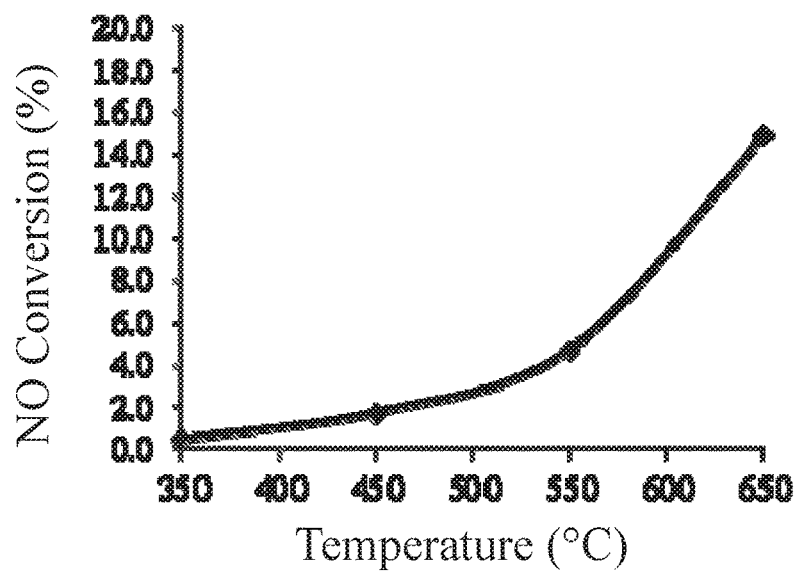
FIG. 4D is a plot of NO conversion percentage as a function of temperature for a co-catalyst system having LaBaCoO$_4$+Ni$_{0.15}$Co$_{0.85}$CoAlO$_4$.
Figure 4E:
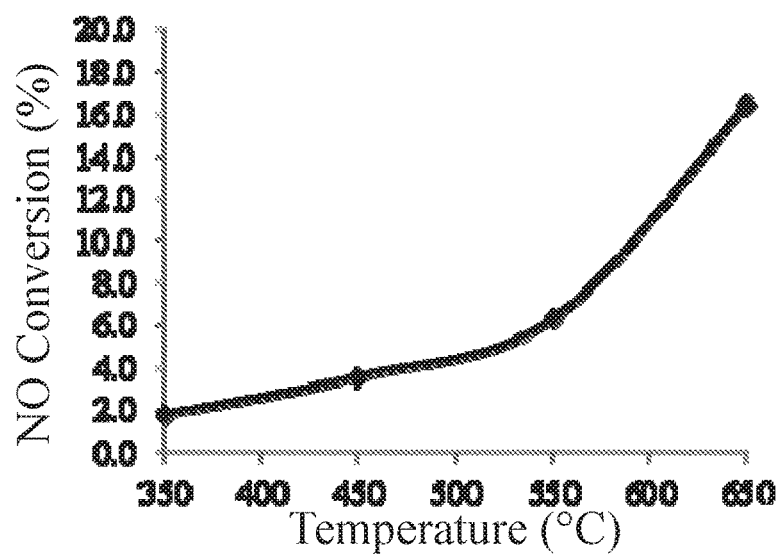
FIG. 4E is a plot of NO conversion percentage as a function of temperature for a co-catalyst system having LaBaFeO$_4$+Ni$_{0.15}$Co$_{0.85}$CoAlO$_4$.

FIGS. 4A-E show nitric oxide (NO) conversion percentages for five different catalysts exposed to a nitric oxide stream at varying temperatures, under conditions described below in the Examples section. The five catalysts of FIGS. 4A-E are: $LaBaCoO_4$ only (FIG. 4A); $LaBaFeO_4$ only (FIG. 4B); $Ni_{0.15}Co_{0.85}CoAlO_4$ only (FIG. 4C); a co-catalyst system 100 having $LaBaCoO_4$ upstream of $Ni_{0.15}Co_{0.85}CoAlO_4$ (FIG. 4D); and a co-catalyst system 100 having $LaBaFeO_4$ upstream of $Ni_{0.15}Co_{0.85}CoAlO_4$ (FIG. 4E). It is to be noted that the total amount of catalyst present is the same in each of the samples corresponding to FIGS. 4A-4E.

A comparison of FIG. 4A and FIG. 4B shows that, while $LaBaFeO_4$ and $LaBaCoO_4$ have very comparable NO conversion percentages across the temperature range 350-550° C., $LaBaCoO_4$ converts about 50% more NO at 650° C. This result suggests that $LaBaCoO_4$ may be particularly suitable as a layered oxide 110. A comparison to the results in FIG. 4C indicates that the exemplary spinel 120, by itself, has only half the NO conversion percentage shown by $LaBaCoO_4$ (FIG. 4A) and 75% of that recorded for $LaBaFeO_4$ (FIG. 4B) at 650° C. However, at lower temperatures, the spinel 120 exhibits moderately higher NO conversion percentages than do the layered oxides 110.

The co-catalyst systems 100 of FIGS. 4D and 4E are arrayed as shown in FIG. 1A, with the layered oxide 110 upstream and the spinel 120 downstream. It will thus be appreciated that in FIGS. 4D and 4E, the layered oxide 110 ($LaBaCoO_4$ or $LaBaFeO_4$) is encountered first by the NO gas stream, and the spinel 120 ($Ni_{0.15}Co_{0.85}CoAlO_4$) is subsequently encountered by the gas stream. A comparison of FIGS. 4A-4E shows that the co-catalysts 100 (FIGS. 4D and 4E) have comparable NO decomposition percentages to those of the individual components (FIGS. 4A-4C) at lower temperatures, with improved NO decomposition percentages at higher temperatures.

Figure 5A:
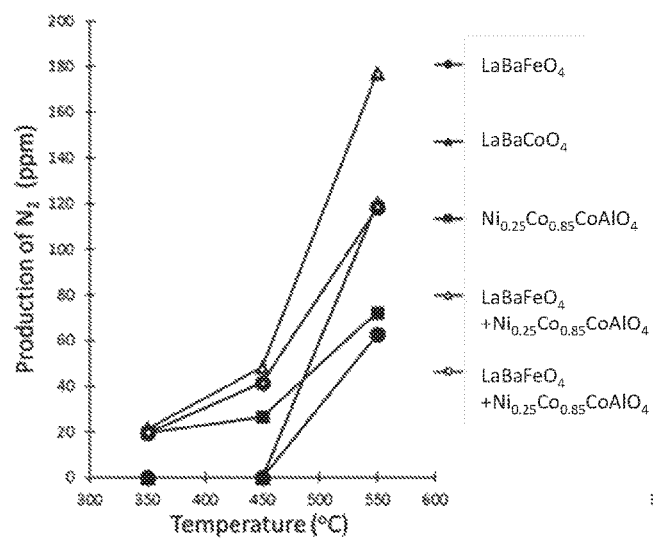
FIGS. 5A and 5B plot production of N$_2$ and percentage of NO reduced to N$_2$, respectively, by various catalyst compositions.

FIG. 5A illustrates plots of $N_2$ production by the five catalysts of FIGS. 4A-4E, in the temperature range 350-550° C. It is readily apparent that the two co-catalyst systems 100 produce $N_2$ as or more efficiently than do the layered oxides 110 or the spinel 120 alone, at all temperatures. The co-catalyst systems 100 produce $N_2$ more efficiently than do all of the individual components at 450° C. In particular, the layered oxides 110 produce virtually no $N_2$ in the temperature range 350-450° C. This demonstrates that the NO that is decomposed by these layered oxides 100 alone within that temperature range (FIGS. 4A and 4B) is converted to other nitrogen-containing species.

Figure 5B:
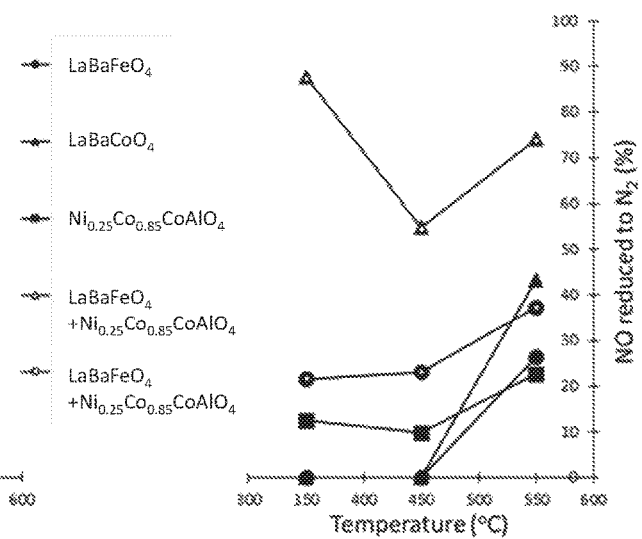

FIG. 5B illustrates plots of the percentage of NO reduced to $N_2$ for the same five catalysts, in the temperature range 350-550° C. Stated alternatively, of that portion of NO that is decomposed by a given catalyst at a given temperature (FIGS. 4A-4E), FIG. 5B plots the percentage of it that is converted to $N_2$, as opposed to another species. Stated yet more succinctly, FIG. 5B shows the $N_2$ specificity of product formation. The results show that both of the co-catalyst systems 100 have superior $N_2$ specificity compared to the layered oxides 110 or the spinel 120 alone at 350-450° C. The co-catalyst system 100 having a layered oxide 110 of $LaBaCoO_4$, in particular, has superior $N_2$ specificity at all temperatures, with an approximately 6-fold higher specificity than the spinel 120 alone at the low temperature of 350° C.

The results of FIGS. 4A-4E and FIGS. 5A-5B generally indicate that deployment of the layered oxide 110 and the spinel 120 in the arrangement of FIG. 1A results in a synergistic effect, and is consistent with the concept of a two-stage catalysis operating through an $N_2O$ intermediate, as discussed above. The results further suggest that $LaBaCoO_4$ is a particularly effective layered oxide 110 for use in the co-catalyst system 100.

Figure 6A:
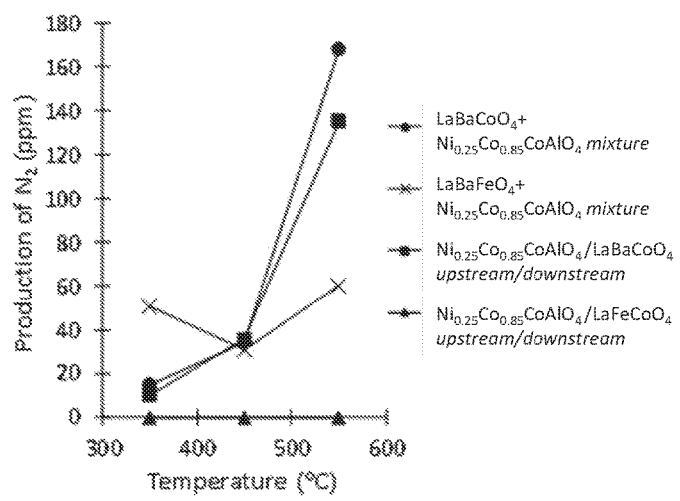
FIGS. 6A and 6B are plots of N$_2$ production and percentage of decomposed NO converted to N$_2$, respectively, for various alternative co-catalyst configurations.
Figure 6B:
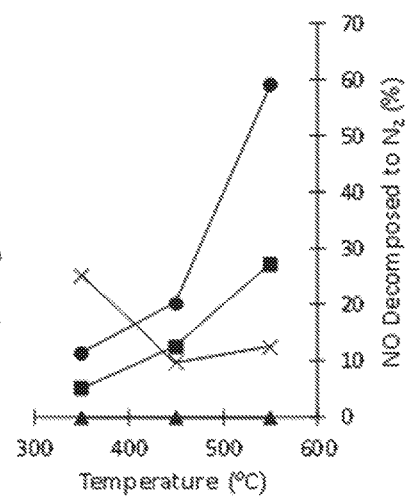

FIG. 6A plots $N_2$ production catalyzed by two mixed co-catalysts and two inverted co-catalysts. FIG. 6B shows $N_2$ specificity of product formation for the same four catalysts. The expression "inverted co-catalyst" refers to a catalyst similar to the co-catalyst system as shown in FIG. 1A, but with the positions of layered oxide 110 and spinel 120 reversed relative to the flow direction, F. Stated alternatively, an inverted co-catalyst is one in which the spinel 120 is upstream and the layered oxide 110 is downstream.

A comparison of FIGS. 6A-6B to FIGS. 5A-5B indicates that the co-catalyst systems 100 having intermixed layered oxide 110 and spinel 120, as in FIG. 1B, are generally less effective than are the co-catalyst systems 100 having layered oxide 110 upstream and spinel 120 downstream, as in FIG. 1A. The results further indicate that the inverted co-catalysts are even less effective. This further supports the view that a co-catalyst system 100 of the present disclosure operates through an $N_2O$ intermediate, as discussed above.

Also disclosed is a two-stage method for removal of $NO_x$ from an exhaust gas stream. The method for removal of $NO_x$ from an exhaust gas stream includes a step of flowing the exhaust gas stream through a co-catalyst system 100. The co-catalyst system 100, as employed in the method for removal of $NO_x$ from an exhaust gas stream, is as described above. The flowing step thus includes: (i) exposing the exhaust gas stream to a layered oxide and catalyzing a reduction of at least one of NO and $NO_2$ to generate $N_2O$; and (ii) exposing the exhaust gas stream to a spinel having a formula $Ni_{0.15}Co_{0.85}CoAlO_4$ to decompose the $N_2O$ to $N_2$. The term "two-stage" as used with respect to the method thus indicates that the exhaust gas stream is exposed to two distinct catalysts, the first catalyst producing, at least in part, an $N_2O$ intermediate, and the second catalyst producing $N_2$.

Further disclosed is an apparatus for removal of $NO_x$ from an exhaust gas stream. The apparatus includes an enclosure; an inlet, configured to receive the exhaust gas stream into the enclosure; and an outlet, configured to allow the exhaust to exit the enclosure. The apparatus further includes a co-catalyst system 100 inside the enclosure, and that is as described above. The inlet and outlet of the apparatus can generally correspond to the inlet and outlet of FIGS. 1A and/or 1B. An example of such an apparatus can be a catalytic converter.

Various aspects of the present disclosure are further illustrated with respect to the following Examples. It is to be understood that these Examples are provided to illustrate specific embodiments of the present disclosure and should not be construed as limiting the scope of the present disclosure in or to any particular aspect.

EXAMPLES

All Example syntheses are conducted under ambient conditions. All chemicals are used as received. With regard to the layered oxides, the metal salt solutions used throughout all of the syntheses are formed most efficiently with sonication. Also, using pre-formed metal salt solutions also dramatically increased the ease of creating reaction emulsions. All emulsions are kept stirring throughout the syntheses so as to avoid any of them breaking. The layered oxide calcination procedures conducted are all done in the same manner for all samples, under a flow of argon with a dwell temperature of 400° C. for 6 hours.

Example 1. Formation of NaOH/CTAB Emulsion

A solution of 3.5 g NaOH dissolved in 25 mL $H_2O$ is added to a flask. 23 mL n-butanol, 112 mL hexane, 22.5 g cetyltrimethylammonium bromide (CTAB), and a stir bar is then added to this flask. The mixture is stirred vigorously to fully dissolve/disperse all components.

Example 2. Synthesis of $LaBaCoO_4$

An aqueous solution of 1.734 g $La(NO_3)_3.6H_2O$, 1.047 g $Ba(NO_3)_2$ and 0.953 g $CoCl_2.6H_2O$, in 14 mL of $H_2O$ is added to a flask. 23 mL n-butanol, 112 mL hexane, 22.5 g CTAB are subsequently added, and the mixture is stirred with a magnetic stir bar. Once all components are dissolved and combined to form an emulsion, the NaOH/CTAB emulsion is added to this LaBaCo/CTAB emulsion, with continuing stirring.

After 30 mins of stirring, 200 mL of ethanol is added to cause the product to precipitate. The product is collected, washed with ethanol followed by $H_2O$ and dried at 180° C. in the air. Calcination is conducted as described above.

Example 3. Synthesis of LaBaFeO$_4$

A pre-formed aqueous solution of 1.734 g La(NO$_3$)$_3$·6H$_2$O, 1.047 g Ba(NO$_3$)$_2$, and 0.796 g FeCl$_2$·4H$_2$O, in 14 mL of H$_2$O, is added to a flask. 23 mL n-butanol, 112 mL hexane, 22.5 g CTAB are subsequently added, and the mixture is stirred with a magnetic stir bar. An emulsion is then allowed to form with aggressive stirring. The NaOH/CTAB emulsion is added to this LaBaFe/CTAB emulsion, always stirring.

After an additional 30 mins of stirring, precipitation is induced with 200 mL of ethanol. The product is collected, washed with ethanol followed by H$_2$O and dried at 180° C. in the air. Calcination is conducted as described above.

Example 4. Synthesis of Ni$_{0.15}$Co$_{0.85}$CoAlO$_4$

Stoichiometric quantities of Co(NO$_3$)$_2$, Al(NO$_3$)$_3$, and Ni(NO$_3$)$_2$ are prepared with a 0.25 M cation concentration, stirred for 30 minutes at room temperature, then 1.5 molar equivalents of anhydrous citric acid is added. The solution is heated to 60° C. for two hours with stirring. Afterwards, ethylene glycol is added at a 40/60 molar ratio with respect to citric acid, and the temperature is increased to 90° C. This is stirred until a gel is formed (~16 hours). The resulting gel is placed in an oven under air, and the temperature is increased to 130° C. at 1° C./min, and maintained for four hours, to promote polyesterification. Next, the temperature is increased to 300° C., linearly at 1° C./min, and held for one hour to decarbonize the sample. The decarbonized sample is ground thoroughly with an agate mortar and pestle, placed in a furnace, under air, and the temperature is increased to 600° C. at 1° C./min, and held for four hours prior to returning to ambient condition.

Catalytic Testing

NO decomposition performance is evaluated using a fixed bed quartz tubular reactor (PID Particulate Systems Microactivity Reference) with 1 cm diameter, while flowing 1% NO/He with 1% Ar tracer, over four separate catalyst configurations. The configuration corresponding to FIG. 1B (mixed co-catalysts or single component catalysts) is a single bed, composed of a mixture of approximately 500 mg catalyst diluted with 100 mg quartz sand, to yield a bed length of 1 cm while maintaining a GHSV of 2,100 h$^{-1}$. In the configuration corresponding to FIG. 1A sequential catalysts or inverted catalysts, the samples are divided into two separate 1 cm length beds, separated by quartz wool.

Prior to reaction, the catalysts are pretreated in UHP He for 30 minutes at 400° C., and reactions are conducted for two hours each at 350, 450, 550, and 650° C., utilizing only the last 10 minutes of data at each condition. An online mass spectrometer (MKS Instruments Inc. Cirrus-2) is utilized to calculate NO conversion by linear interpolation between the base line m/z 30 signal (He flow only), and the m/z 30 signal of the reaction mixture through reactor bypass, while monitoring m/z 28, 32, 40, 44, 46 (N$_2$, O$_2$, Ar, N$_2$O, NO$_2$). The Ar present in the reactant stream acted as tracer of constant concentration, and the Ar signal at m/z=40 is used to normalize each of the mass spectrum traces. To determine the total N$_2$ production, a calibration gas consisting of 1137 ppm N$_2$ in a He balance is utilized to calibrate the m/z=28 response by creating a calibration curve. The calibration curve is utilized to calculate a quantified N$_2$ production.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A catalytic converter for the removal of NO$_x$ from an exhaust gas stream operating between 350 and 550° C., the catalytic converter comprising:
    an inlet configured to receive the exhaust gas stream into an enclosure;
    an outlet configured to allow the exhaust gas stream to exit the enclosure; and
    a co-catalyst system contained inside the enclosure, the co-catalyst system having:
        a layered oxide configured for catalyzing a reduction reaction of at least one of NO and NO$_2$ to generate N$_2$O, the layered oxide selected from the group consisting of:

LaBaCoO$_4$; and

LaBaFeO$_4$; and a spinel having a formula, Ni$_x$Co$_{1-x}$CoAlO$_4$, configured for catalyzing a decomposition reaction of N$_2$O to N$_2$.

2. The catalytic converter according to claim 1, wherein the co-catalyst system is configured as a sequential co-catalyst and the exhaust gas stream moves in a flow direction, with the layered oxide being positioned upstream of the spinel structure relative to the flow direction.

3. The catalytic converter according to claim 2, wherein the enclosure defines first and second adjacent chambers, wherein the first chamber comprises the layered oxide and receives the exhaust gas from an upstream portion of the catalytic converter, and the second chamber comprises the spinel structure and receives the exhaust gas after passing through the first chamber.

4. The catalytic converter according to claim 3, further comprising a separation space between the first chamber and the second chamber.

5. The catalytic converter according to claim 1, wherein the co-catalyst system is configured as a mixed co-catalyst.

6. The catalytic converter according to claim 5, wherein the layered oxide and the spinel occupy the same space.

7. The catalytic converter according to claim 5, wherein the layered oxide and the spinel occupy partially overlapping regions.

8. The catalytic converter according to claim 1, wherein the layered oxide is in a nanoparticle form, of 2 to 50 nm in diameter.

9. The catalytic converter according to claim 1, wherein the spinel has a formula, Ni$_{0.15}$Co$_{0.85}$CoAlO$_4$.

10. The catalytic converter according to claim 1, wherein the spinel is in nanoparticle form, of 2 to 50 nm in diameter.

\* \* \* \* \*